United States Patent [19]
Genter

[11] Patent Number: 5,721,730
[45] Date of Patent: Feb. 24, 1998

[54] SPECTRAL NOISE COMPENSATION FOR TELECOMMUNICATION SIGNAL PROCESSING

[75] Inventor: Roland E. Genter, Falls Church, Va.

[73] Assignee: Coherent Communications Systems Corp., Leesburg, Va.

[21] Appl. No.: 674,324

[22] Filed: Jul. 1, 1996

Related U.S. Application Data

[63] Continuation of Ser. No. 498,632, Jul. 6, 1995, Pat. No. 5,561,668.

[51] Int. Cl.$^6$ .................... H04B 3/20; H04M 9/08
[52] U.S. Cl. .................. 370/288; 370/290; 379/409
[58] Field of Search .................... 370/201, 286, 370/288, 289, 290; 379/390, 406, 409, 410, 411

[56] References Cited

U.S. PATENT DOCUMENTS

| | | | |
|---|---|---|---|
| 4,644,108 | 2/1987 | Crouse et al. | 379/406 |
| 4,956,838 | 9/1990 | Gilloire et al. | 370/291 |
| 5,001,701 | 3/1991 | Gay | 370/290 |
| 5,136,577 | 8/1992 | Amano et al. | 370/289 |
| 5,157,653 | 10/1992 | Genter | 370/288 |
| 5,272,695 | 12/1993 | Makino et al. | 370/291 |
| 5,274,705 | 12/1993 | Younce et al. | 379/410 |
| 5,283,784 | 2/1994 | Genter | 370/288 |
| 5,285,165 | 2/1994 | Renfors et al. | 327/552 |
| 5,289,539 | 2/1994 | Maruyama | 379/410 |
| 5,305,307 | 4/1994 | Chu | 370/288 |
| 5,315,585 | 5/1994 | Iizuka et al. | 370/289 |
| 5,365,583 | 11/1994 | Huang et al. | 379/390 |
| 5,477,534 | 12/1995 | Kusano | 370/286 |
| 5,477,535 | 12/1995 | Lahdemaki | 370/288 |
| 5,561,668 | 10/1996 | Genter | 370/288 |

*Primary Examiner*—Alpus H. Hsu
*Attorney, Agent, or Firm*—Dann, Dorfman, Herrell and Skillman, P.C.

[57] ABSTRACT

A telecommunication signal processor includes a noise compensation system for preventing undesirable spectral modulation of the noise component of a telecommunication signal subjected to a process wherein subband portions of the signal are variably attenuated. A noise component is injected into each attenuated error signal in order to compensate for attenuation of background noise incidental to the variable attenuation of the subband signals. The amplitude of the noise components are each determined independently on the basis of an estimated noise content of the original subband signals and in accordance with the applied attenuation within each subband. The attenuated and noise-compensated subband signals are combined by a synthesis filter to provide a send-output signal.

7 Claims, 3 Drawing Sheets

SPECTRAL NOISE COMPENSATION FOR TELECOMMUNICATION SIGNAL PROCESSING

CROSS-REFERENCE TO RELATED APPLICATIONS

This is a continuation of U.S. application Ser. No. 08/498,632, filed Jul. 6, 1995, now U.S. Pat. No. 5,561,668.

FIELD OF THE INVENTION

The present invention relates to an echo canceler having subband attenuation control for reducing residual echo, and having subband noise estimation and injection for providing spectrally-matched noise compensation.

BACKGROUND OF THE INVENTION

Two-way telecommunication systems are often prone to the phenomenon of echo. Echo is a result of coupling between signals travelling in opposite directions within a telecommunication system. For example, reflections from a four-wire to two-wire hybrid are a well known source of echo in telephone networks. Other sources of echo include acoustic or electromagnetic coupling of received signals and transmitted signals within a terminal device, such as a telephone. Acoustic echo, for example, can result from the microphone of a telephone responding to audio signals emitted by the speaker. Acoustic echo can be particularly acute in an enclosed environment, such as in mobile cellular telephony.

Echo cancelers are commonly employed to substantially reduce transmission of echoes within telecommunication networks. A traditional echo canceler includes a transversal filter which is characterized by coefficients of the impulse response of the near-end terminal equipment. The transversal filter is connected to receive a near-end receive signal, and to produce an estimated echo signal. The estimated echo signal is subtracted from the send signal transmitted by the near-end terminal equipment. Echo cancelers have contributed substantially to the intelligibility of low-loss long distance, satellite and fiber optic telephone networks. Examples of such echo cancelers are described in U.S. Pat. Nos. 4,064,379; 4,113,997; 4,321,686; 4,360,712; 4,377,793; and 4,600,815 to Horna, and in U.S. Pat. Nos. 3,780,233; 3,789,233; 3,836,734; 3,894,200 to Campanella.

Even the best echo cancelers are imperfect at entirely removing echo, due to the finite amount of time required to initially develop, and to subsequently update, the presumed impulse response of the near-end echo path. Additionally, the inherent quantization error of digital signals imposes a limit on the accuracy with which echo can be estimated and removed. Thus, a residual echo component, that is distinct from uncorrelated background noise, remains within an echo-canceled signal. The residual echo component is presumed to have a low amplitude. Hence, the traditional approach to reducing residual echo has been to employ a center clipper for blocking the low amplitude components of echo-canceled signals. Typically, the center clipper is selectively deactivated when the near-end send signal is large, in order to avoid zero-crossing distortion of transmitted speech. However, selective activation and de-activation of the center clipper also tends to undesirably modulate low-amplitude background noise components of the transmitted signal. Such modulation can be perceived at the far end as occasional disconnection of the communication channel. Additionally, selectively-activated center clippers can undesirably clip softly-spoken syllables.

U.S. Pat. Nos. 5,157,653 and 5,283,784 to Genter, describe an echo canceler wherein a variable attenuator is employed to attenuate the echo-canceled signal over a continuous range of attenuation. The attenuation is determined by an attenuation factor that is varied in response to comparison of relative levels of the receive signal, the send signal, and the echo-canceled signal, in order to attenuate residual echo. To reduce the perceptibility of the operation of the attenuator, changes in the attenuation factor are made gradually during finite intervals of time, rather than abruptly.

To further reduce the perceptibility of variable attenuation for residual echo reduction, the aforementioned Genter patent discloses injection of a compensating noise component into the attenuated echo-canceled signal. The level of the injected noise component is determined on the basis of an estimated noise component of the send signal and the prevailing attenuation applied by the attenuator. As further described therein, the compensating noise component is derived from a noise source for providing a noise signal having a predetermined spectral characteristic, such as white noise or noise that is otherwise band shaped to approximate typical telephone circuit noise. Of course, "typical" telephone circuit noise can vary considerably, as can ambient acoustic noise in the vicinity of a telephone user. For example, telephone signals produced by a mobile user of a cellular radio telephone system may include noise that is spectrally distinct from noise within telephone signals produced by a stationary user of a twisted-pair local loop. Hence, even a slow transition from the actual background noise to an artificial injected noise may be distinctly perceptible and distracting to the far end listener. Thus, it would be desirable to provide an echo canceler wherein an injected noise component is more accurately related to the prevailing noise spectrum within the transmitted signal.

SUMMARY OF THE INVENTION

In accordance with one aspect of the present invention, an echo canceler is provided wherein a send-input signal having a finite bandwidth, is divided into a plurality of subband send-input signals for independent echo cancellation. The receive-input signal is also divided into subband receive-input signals. The subband receive-input channel signals are each convolved with a corresponding estimated impulse response pertaining to an echo path between the receive-input signal and the send-input signal within the corresponding subband, to produce respective estimated subband echo signals. Each of the subband echo signals is subtracted from the corresponding subband send-input channel signal to produce respective subband error signals. Residual echo is then reduced by variably attenuating the subband error signals on an independent basis in response to a comparison of the relative levels of the corresponding subband send-input signals, subband receive-input signals, and subband error signals.

In accordance with another aspect of the invention, noise components are added, or injected, into the variably-attenuated subband error signals in order to compensate for incidental attenuation of background noise within the respective attenuated error signals. The level of each of the injected noise components is independently controlled in proportion to the attenuation applied to the corresponding subband error signal. Each injected noise component is further controlled in proportion to a determined noise level within the corresponding subband send-input channel signal. The resulting noise component of the send-output signal is thereby spectrally matched to the noise component of the send-input signal.

According to yet another aspect of the invention, the computational complexity of the echo canceler is reduced by providing the subband send-input signals and the subband receive-input signals as decimated signals. Decimating the subband signals reduces the required bit rate for encoding the audio content thereof.

Other new and useful aspects of the invention, and advantages pertaining thereto, shall be made apparent hereby.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
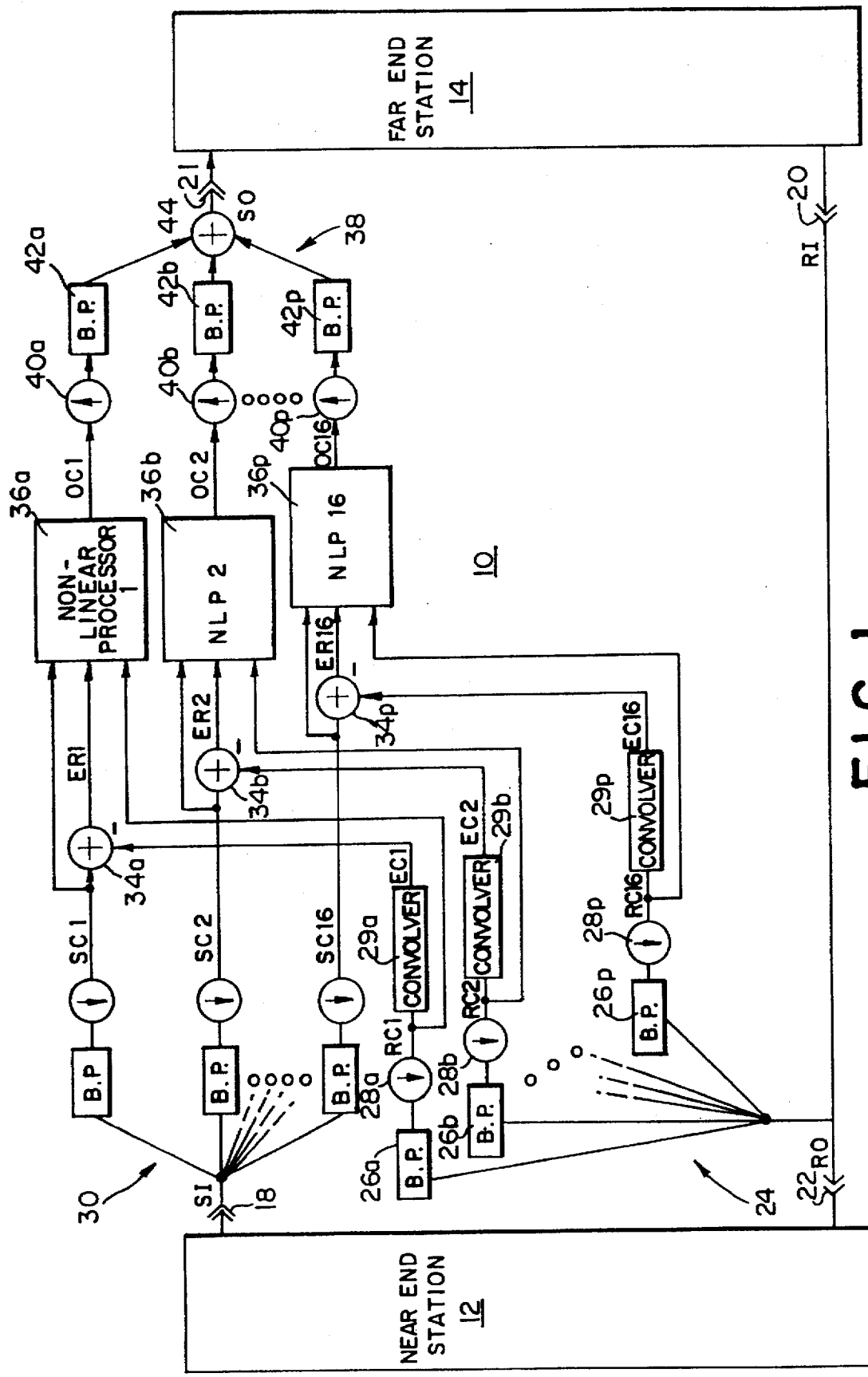
FIG. 1 is a functional block diagram of an echo canceler according to the invention.

Referring now to FIG. 1, there is shown an echo canceler 10. The echo canceler 10 is connected within a telecommunication system between a near-end station 12 and a far-end station 14. The near-end station 12 may include a telephone, a hybrid, a codec, or other equipment, such as a central office associated with providing telephone service to a near-end user. The near-end station produces and transmits a signal that is provided as a send-input signal, SI, to terminal 18 of the echo canceler 10. The send-input signal, SI, is processed by the echo canceler 10 for removal of echo. The processed signal is provided as a send-output signal, SO, at terminal 21 for transmission to the far-end station 14. The far-end station 14 produces and transmits a signal that is received by the echo canceler 10 as a receive-input signal, RI, at terminal 20. The receive-input signal, RI, is provided as a receive-output signal, RO, at terminal 22 of the echo canceler 10 for transmission to the near-end station 12.

The receive-input signal, RI, is analyzed by a multi-channel filter bank 24. In the preferred embodiment, RI and SI are a digital telephone signals, each having a data rate of 64 Kb/s and an audio bandwidth of about 3,000 Hz, extending from about 300 Hz to about 3,300 Hz. The filter bank 24 includes bandpass filters 26a–p for dividing RI into 16 approximately 250 Hz—wide subband channel signals (the respective bands of the filters 26a–p being partially overlapping). The filter bank 24 further includes decimation filters 28a–p, each connected to receive one of the subband channel signals from a corresponding one of band pass filters 26a–p, for effectively shifting the audio content of the subband channel signal into the baseband and reducing the data rate required to encode the audio content thereof. Each of the decimation filters reduces a subband input signal to an output signal having an audio bandwidth of between about 0–250 Hz. The filter bank 24 analyzes the receive-input signal, RI, into 16 decimated subband receive-input signals, RC1–RC16, which are then provided at the respective output terminals of the decimation filters 28a–p.

The signals RC1–RC16 are provided from filter bank 24 to respective convolvers 29a–p. Each of the convolvers comprises a memory for providing a shift register for storing a set of successive values of the corresponding receive channel signal, and for storing a set of echo path impulse response coefficients associated with the corresponding channel (i.e. the impulse response of the echo path between terminal 22 and terminal 18). The convolvers 29a–p are each configured for convolving one of the signals RC1–RC16 with the stored impulse response coefficients. The convolvers 29a–p are preferably configured for adapting to changes in the respective subbands of the echo path by periodically updating the stored impulse response coefficients. Each of the resulting output signals, EC1–EC16, represents an estimated echo signal pertaining to the corresponding subband. Preferably, the convolutions represented by convolvers 29a–p, are performed by a single digital signal processor on a time-shared basis among the respective subband channels.

A 16-channel decimated filter bank 30, similar in operation to filter bank 24, is connected with terminal 18 to receive the send-input signal, SI. The filter bank 30 analyzes SI into 16 decimated subband send-input signals SC1–SC16. The echo canceler then subtracts each of the estimated echo signals EC1–EC16 from the corresponding one of decimated subband send-input signals SC1–SC16, in order to produce respective error signals ER1–ER16. As represented in FIG. 1, each of the estimated echo signals EC1–EC16 is provided to an inverting input of a corresponding one of summing amplifiers 34a–p. Each of the signals SC1–SC16 is provided to a non-inverting input of a corresponding one of amplifiers 34a–p. Amplifiers 34a–p perform the indicated subtractions of the corresponding subband send-input signals and estimated echo signals, to provide error signals ER1–ER16 at the respective output terminals of the amplifiers 34a–p.

The error signals ER1–ER16 are then subjected to further processing in order to attenuate residual echo components thereof. Such further processing includes independently attenuating each of the error signals on the basis of the relative strength of the respective error signals ER1–ER16, the corresponding subband send-input signals SC1–SC16, and the corresponding subband receive-input signals RC1–RC16. Additionally, such further processing preferably includes adding a compensating noise component to the attenuated error signals independently and in proportion to the degree of attenuation applied to each of the respective error signals. As represented in FIG. 1, such further processing is provided by non-linear processors 36a–p.

Each non-linear processor 36a–p is connected to receive a corresponding one of the error signals ER1–ER16. The non-linear processors 36a–p selectively attenuate the error signals ER1–ER16, and inject compensating noise therein to provide respective output channel signals, OC1–OC16, at the output terminals of the respective non-linear processors 36a–p.

The output channel signals OC1–OC16, are then combined, or synthesized, to produce the send-output signal, SO, at terminal 21. For example, a synthesis filter bank 38 is connected to receive the signals OC1–OC16. The filter bank 38 includes interpolation filters 40a–p for interpolating each of the output channel signals OC1–OC16, such that the audio spectrum of each output channel signal is, in effect, relocated about the center frequency of the corresponding bandpass filter of the send-input analysis filter bank 30. The output signals produced by the respective filters 42a–p are then combined, for example by summing amplifier 44, to provide the send-output signal SO at terminal 21.

Figure 2:
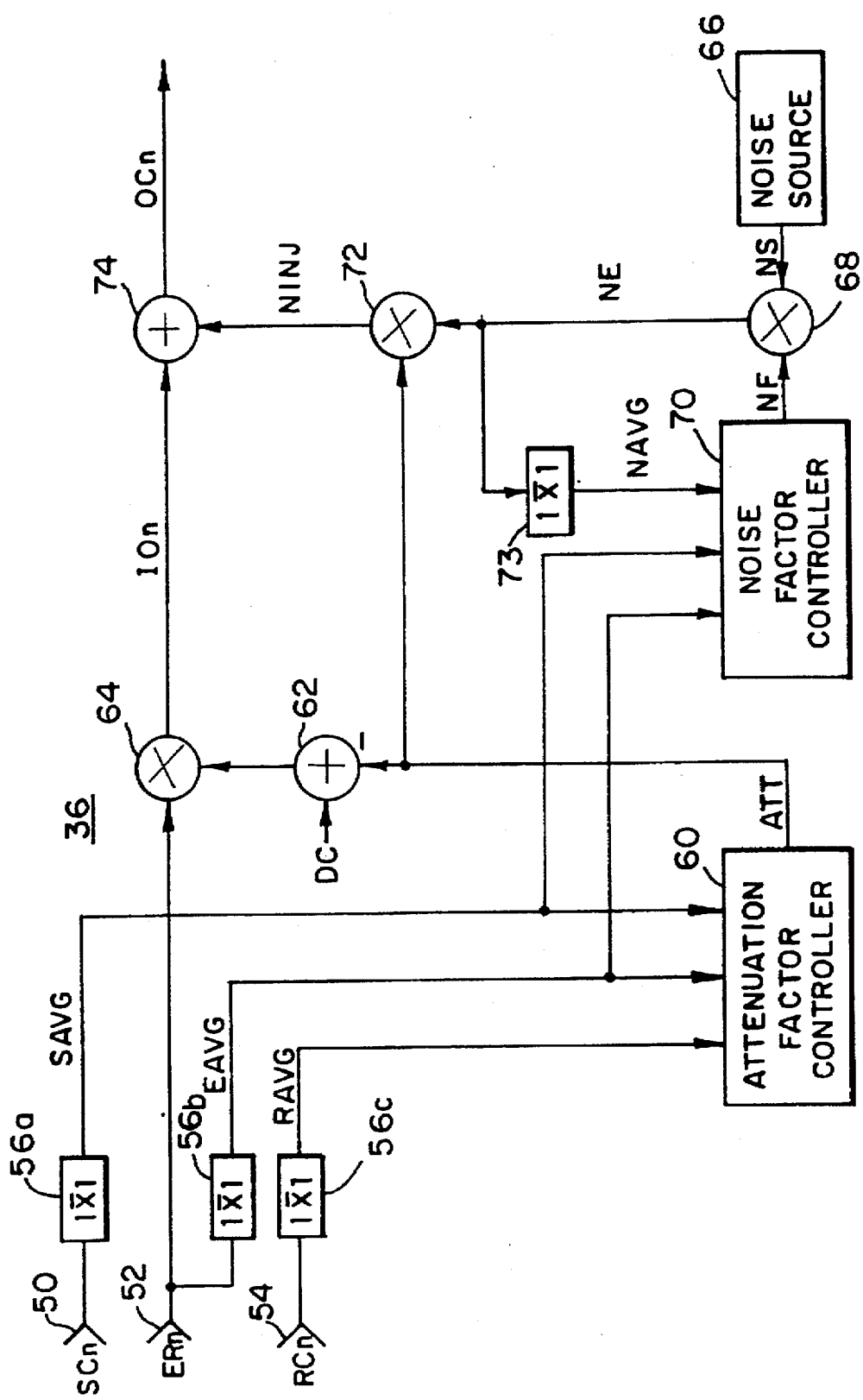
FIG. 2 is a functional block diagram of a non-linear processor employed within the echo canceler of FIG. 1.

The operations performed upon the error signals ER1–ER16 by the non-linear processors 36a–p are represented in greater detail in FIG. 2, in connection with a representative non-linear processor 36. The non-linear processor 36 receives a send-input subband signal, SCn; an error signal ERn; and a receive-input subband signal, RCn. Filters 56a–c are connected to receive the respective input signals, SCn, ERn and RCn, and are each responsive thereto for producing a statistical measure of each of the input signals in the form of a nonzero-mean signal. For example, the filters 56a–c may provide moving averages SAVG, EAVG and RAVG, of the absolute values of the respective input signals SCn, ERn, and RCn. In alternative embodiments, other nonzero-mean values, such as squared values, mean-squared values, root-mean-squared values, or logarithms thereof may be provided by the filters 56a–c in order to provide a comparison level in respect of each of the input signals SCn.

Figure 3:
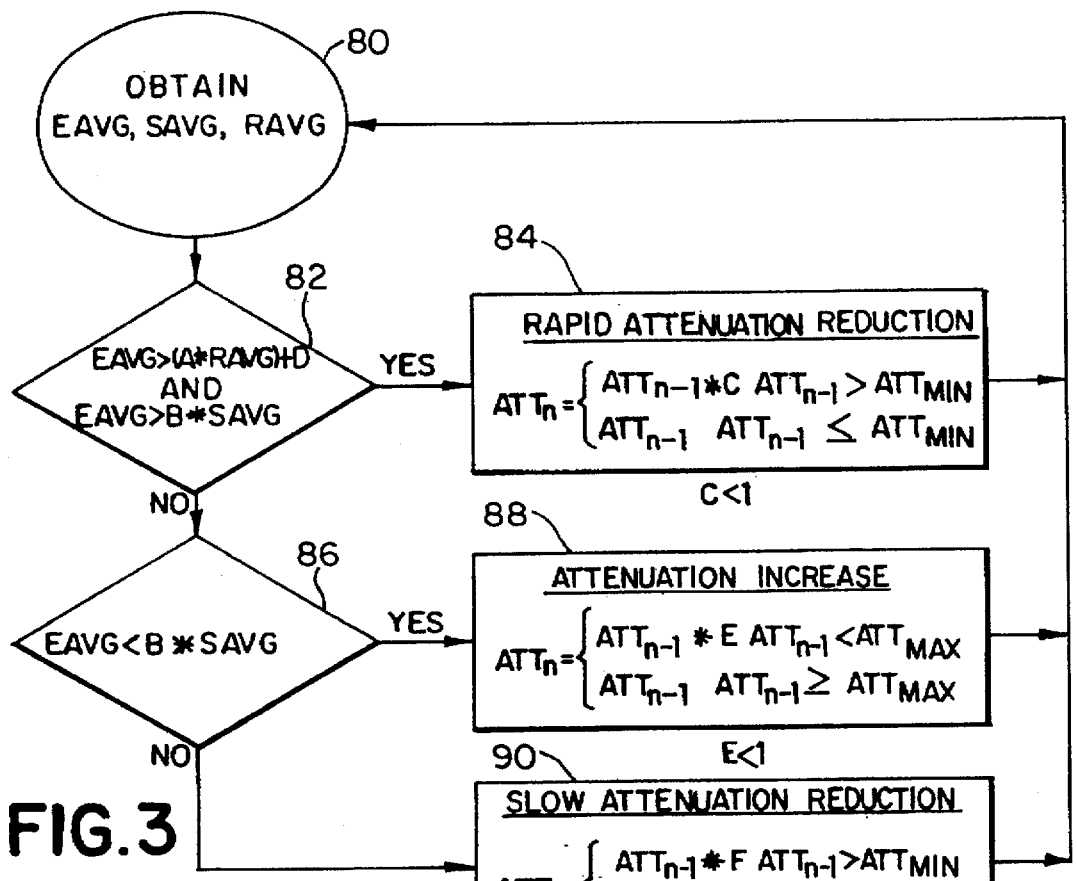
FIG. 3 is a logical flow diagram of an attenuation control procedure executed within the echo canceler of FIG. 1.

The average value signals, SAVG, EAVG, and RAVG, are provided to an attenuation factor controller 60 for determining an attenuation factor, ATT, to be applied to the error signal, ERn, in order to reduce residual echo. A preferred procedure executed by the attenuation factor controller 60 is illustrated in FIG. 3.

Beginning at step 80, the attenuation factor controller 60 obtains the most current values of EAVG, SAVG, and RAVG pertaining to one of the subband channels. Execution then proceeds to step 82.

In step 82, the attenuation factor controller 60 determines whether the values of EAVG, RAVG, and SAVG are indicative of a condition wherein communication within the selected subband channel between the near-end station and the far-end station is dominated by signals produced at the near-end. For example, when EAVG is greater than a predetermined proportion of RAVG plus a relatively small constant level, D (i.e. when EAVG>A*RAVG, where A*RAVG is preferably 18 dB or less below RAVG and D is about −50 dBm0), and when EAVG is greater than a predetermined proportion of SAVG (i.e. when EAVG>B*SAVG, where B<1 and B*SAVG is preferably below SAVG by about 12 dB or more), then it may be assumed that the near-end station is producing a substantially larger send signal than the far-end station. If the conditions of step 82 are satisfied, then execution proceeds to step 84. Otherwise, execution proceeds to step 86.

In step 84, the attenuation factor is decremented by a predetermined amount. For example, the attenuation factor may be multiplied by a factor of C<1. Under the conditions for entry to step 84, the large near-end send signal will tend to mask any residual echo signal, even in the absence of applied attenuation. Therefore, the attenuation factor controller 60 operates to rapidly decrease the attenuation factor, ATT, to a predetermined minimum value, $ATT_{min}$. In alternative embodiments, wherein EAVG, SAVG, and RAVG are logarithmic quantities, the attenuation factor may be reduced by subtracting a predetermined decrement value therefrom. The attenuation factor reduction performed in step 84 is large enough that iterated execution of step 84 is sufficient to reduce the attenuation factor from a predetermined maximum value, $ATT_{max}$ to $ATT_{min}$ within less than 100 ms, and preferably about 2 ms. From step 84, the attenuation factor controller 60 returns to step 80.

In step 86, the attenuation factor controller 60 determines whether EAVG is less than a predetermined proportion of SAVG (i.e. when EAVG<B*SAVG). When the condition defined in step 86 is satisfied, then a significant proportion of the send-input subband signal, SCn, is presumed to consist of echo that is being removed by the echo canceler. Under such a condition, the near-end station is relatively quiet, and the error signal consists of a relatively high proportion of residual echo. If the condition of step 86 is satisfied, then execution proceeds to step 88. Otherwise, execution proceeds to step 90.

In step 88, the attenuation factor controller 60 rapidly increases the attenuation factor, ATT toward a maximum level, $ATT_{max}$, in order to reduce transmission of residual echo to the far-end station. Such an increase can be carried out by multiplying the attenuation factor by a predetermined constant, E>1, or by adding a predetermined increment, until the attenuation factor is greater than, or equal to, the maximum value $ATT_{max}$. As can be appreciated, the attenuation factor will be increased, in step 88, whenever EAVG is less than a predetermined proportion of SAVG, preferably when EAVG is below SAVG by about 12 dB or more. Execution then returns to step 80.

In step 90, none of the previously-defined conditions of step 82 or step 86 prevails. If step 90 is reached, then EAVG is not significantly higher than RAVG plus a small offset, and EAVG is within 12 dB of SAVG. In such a situation, EAVG is close enough to SAVG that relatively little echo is being subtracted. Additionally, EAVG is either very low relative to RAVG or both EAVG and RAVG are very low relative to the small offset, D, defined in step 82. In such circumstances, the attenuation factor controller 60 slowly reduces the attenuation factor toward a minimum value. The attenuation factor is reduced in step 90, by a decrement sufficient to reach $ATT_{min}$ within about 1 to 5 seconds. If, in fact, a double-talk condition prevails, then some residual echo may be perceptible at the far end. However, since an attenuation factor is determined independently for each subband, there will be some bands in which the attenuation factor is maintained at a relatively high level due to relative spectral variations between the send-in and receive-in signals during double-talk. Additionally, even in a double-talk situation, it is unlikely that double-talk will prevail within a single subband for a significantly long period of time, since the near-end and far-end speech signals are presumably uncorrelated. Thus, any residual echo components that are transmitted to the far end during double-talk by the echo canceler of the present invention, are significantly less perceptible than when a single attenuation factor decision for the entire transmission band is made by previously-known echo cancelers. After step 90, the attenuation controller returns to step 80.

Referring again to FIG. 2, the attenuation factor is converted to a gain signal, for example, by subtracting the attenuation factor from a constant value as shown in connection with summing amplifier 62. The gain signal is then provided as a control input into a variable gain amplifier 64. The error signal ERn is applied as an input signal to amplifier 64, and is multiplied by the applied gain to produce an attenuated error signal, shown as intermediate output signal IOn, at the output terminal of amplifier 64. In embodiments wherein the filters 56a–c each produce a nonzero-mean signal that is not directly proportional to the amplitude of the input signal, then conversion means may be provided for converting the attenuation factor to an appropriate linear or logarithmic scale for modulating the amplitude of the error signal. For example, if the respective SAVG, EAVG, and RAVG signals include moving average square values, then the square root of the attenuation factor may be determined and applied to amplifier 62. Preferably, as discussed further hereinbelow, the output of summing amplifier 62 is further varied as a sinusoidal function with respect to the attenuation factor.

The amplifier 64 amplifies the error signal inversely relative to the attenuation factor determined by the attenuation factor controller 60. Any noise component of the error signal will also be modulated according to adjustments made to the attenuation factor. For example, when the attenuation factor is at the maximum value, the noise component of the error signal, ERn, will be attenuated along with the residual echo. In order to prevent the far end listener from perceiving potentially distracting noise amplitude variations caused by residual echo elimination, a noise determination and injection system is provided for determining the noise content of the error signal, and for injecting a compensating noise component into the outbound signal. The compensating noise component is preferably directly proportional to a determined noise content of the error signal and is also controlled relative to the determined attenuation factor to maintain a constant noise level in the output signal as the attenuation factor is varied. In alternative embodiments wherein incidental noise modulation is deemed acceptable, the intermediate output signal, IOn, may be directly provided from the non-linear processor as the output channel signal for subsequent reconstruction and combination with similarly-processed signals to provide the send-output signal.

A noise source 66 is provided for producing a noise signal, NS. The noise source 56 may comprise a memory device for storing a series of pseudo-random numerical values that are cyclically retrieved from the memory device. The spectrum of the noise signal NS is preferably flat across the preferred subband width. The noise signal NS is provided as an input to a variable gain amplifier 68. The gain of amplifier 68 is controlled by a noise factor, NF, provided thereto by noise factor controller 70. The amplifier 68 multiplies NF and NS to produce an estimated noise signal, NE, that is thereby modulated in accordance with the estimated noise content of the error signal ERn. The estimated noise signal, NE, is provided as an input to variable gain amplifier 72. The gain of amplifier 72 is controlled by the attenuation factor ATT in order to multiply NE and ATT to produce an output noise injection signal, NINJ. The noise injection signal NINJ is thereby conversely modulated relative to the intermediate output signal, IOn. Hence, the noise injection signal, NINJ, provides a noise signal that is representative of the noise component of the error signal attenuated by amplifier 64. The noise injection signal, NINJ, is then added to the intermediate output signal, IOn (e.g. by summing amplifier 74) to produce the output channel signal, OCn, of the non-linear processor 36. Preferably, amplifier 72 varies the amplitude of NINJ in accordance with a sinusoidal function of the attenuation factor.

As has been mentioned hereinabove, the gain produced by amplifier 62 is varied as a sinusoidal function of a DC level minus the attenuation factor. Hence, if the attenuation factor is varied between O and $\pi/2$, and if the DC level is maintained at $\pi/2$, then the gain applied to the error signal by amplifier 62 will vary as the cosine of the attenuation factor. Additionally, the gain applied to the estimated noise signal by amplifier 62 will vary as the sine of the attenuation factor. Hence, the sum of the square values of the noise content of the intermediate output signal and the noise injection signal will remain constant, which is the condition for maintaining a constant power level of the sum of two uncorrelated signals.

Figure 4:
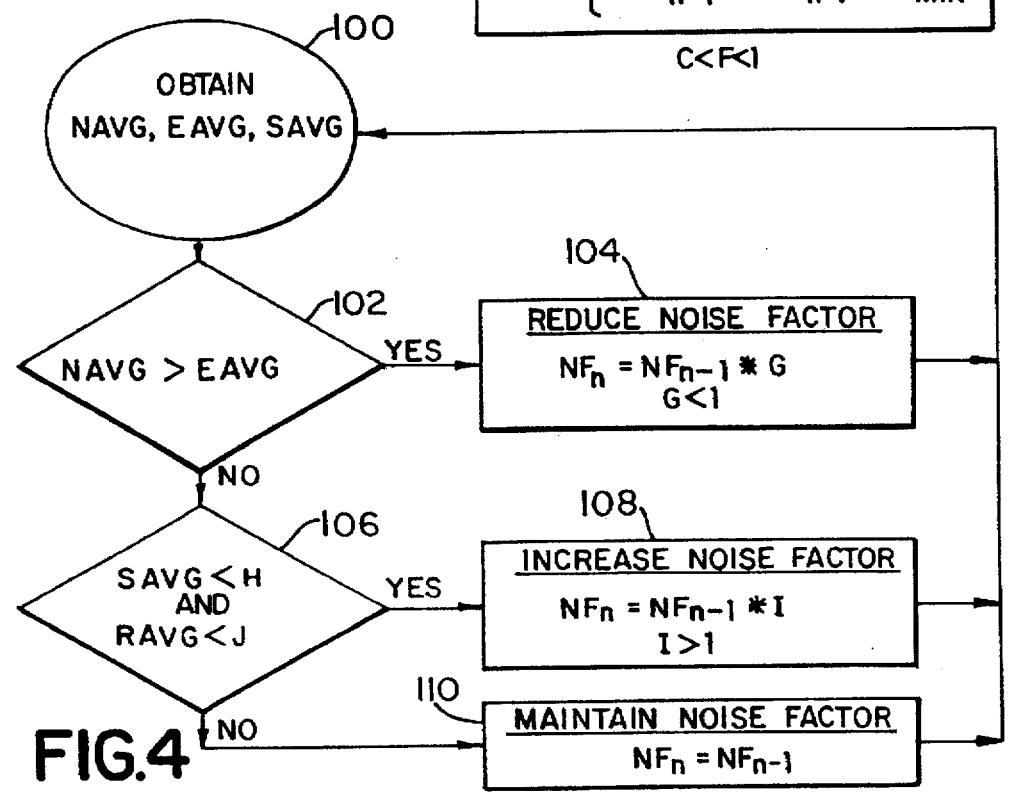
FIG. 4 is a logical flow diagram of a noise injection control procedure executed within the echo canceler of FIG. 1.

The noise content of the send-output channel signal SCn, may be controlled, by the noise factor controller 70, on the basis of the relative values of SAVG, EAVG, and an estimate of the noise content. An averaging filter 73 is connected to receive the estimated noise signal NE, and to provide a moving average of the absolute value thereof as an input signal, NAVG, to the noise factor controller. In the preferred embodiment, the noise factor controller proceeds according to the flow diagram shown in FIG. 4.

Beginning at step 100, the noise factor controller obtains the most current values of NAVG, EAVG, and SAVG. Then, the noise factor controller proceeds to step 102.

In step 102, the noise factor controller determines whether the most current value of NAVG is greater than EAVG. If NAVG is greater than EAVG, then the noise factor controller proceeds to step 104. Otherwise, the noise factor controller proceeds to step 106.

In step 104, the noise factor is reduced by a predetermined factor, G<1, or by subtracting a predetermined decrement. As can be appreciated, the noise factor will be reduced, in step 104, whenever NAVG exceeds EAVG. Such a reduction is preferably rapid, since the estimate of the noise content of the error signal should be kept below the average amplitude of the error signal. After step 104, execution returns to step 100.

In step 106, the noise factor controller determines whether SAVG is below a predetermined threshold value H. The predetermined value H, is selected to be sufficiently low, for example −45 dbm0, such that if SAVG is less than H, it can be assumed that the send-input signal is predominantly low-amplitude background noise, and not speech. Additionally, it is preferable to also determine, in step 106, whether RAVG is also below a predetermined threshold, J, such as −45 dbm0, in order to avoid modulating the noise factor in response to variations in reflected far end speech. In alternative embodiments, other tests may be conducted in step 106 to determine whether the subband send-input channel signal SCn, is representative of speech or noise. For example, the noise factor controller may conduct an alternative statistical test to determine whether a statistical figure of merit, such as the variance of the send-input channel signal, or the error signal, is indicative of a speech or noise-dominated signal. If, in step 106, it is determined that the send-input signal is primarily dominated by noise, then the noise factor controller proceeds to step 108. Otherwise, the noise factor controller proceeds to step 110.

In step 108, the noise factor, NF, is increased by a predetermined factor, I>1, or by a predetermined additive increment. The incremental increase in the noise factor that is effected in step 108, is preferably lower in magnitude than the incremental decrease effected in step 104 (i.e. I<G$^{-1}$), since it is clearly imperative to rapidly reduce the noise factor such that NAVG is reduced below EAVG, whereas any desired increase in the noise factor should be approached more conservatively and hence, slowly. After step 108, execution returns to step 100.

In step 110, no change is effected in the noise factor, it having been already determined that NAVG does not exceed EAVG and that SAVG is not indicative of the send-input channel signal being dominated by noise. After step 110, execution returns to step 100.

In the preferred embodiment, the echo canceler 10 of FIG. 1, is implemented by a single digital signal processor having an arithmetic logic unit for computing successive values of the receive-input and send-input subband channel signals, and for performing the convolutions, non-linear processing, and other computational operations described hereinabove, on a time-shared, or time-division-multiplexed basis among the respective subbands. The arithmetic logic unit is connected with a sufficient number of memory registers for storing a plurality of the successive subband signal values, the respective impulse coefficients, and the other required quantities for performing the various operations described hereinabove. Because the subband channel signals are preferably decimated, the rate at which the respective convolutions are performed may be reduced relative to the sample rate at which the send-input and receive-input signals are received, thus reducing the required calculation rate relative to a broad-band, or single channel echo canceler.

In alternative embodiments, the echo canceler 10 of FIG. 1 may be implemented using a plurality of digital signal processors operating in parallel, wherein each processor is configured for processing a subset of the subbands on a space-division multiplex basis.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

That which is claimed is:

1. A method of compensating for subband attenuation of a noise component of a telecommunication signal subjected to a subband process wherein subbands of the telecommunication signal are attenuated according to respective independent attenuation factors, the method comprising:

receiving the telecommunication signal as a send-input signal at a send-input terminal;

dividing the send-input signal into a plurality of subband signals;

applying the independent attenuation factor to each of the subband signals, thereby providing processed subband signals;

generating a subband noise signal that is proportional to the corresponding independent attenuation factor for each subband signal;

combining the subband noise signals with the respective processed subband signals, thereby providing output subband signals; and combining the output subband signals to provide a send-output signal for transmission from a send-output terminal.

2. The method of claim 1, wherein the subband process comprises the step of canceling echo signals from the respective subbands.

3. The method of claim 1, comprising the step of estimating an estimated noise level within each of the subbands of the send-input signal, and wherein said generating step further comprises generating each subband noise signal in proportion to the corresponding estimated noise level.

4. The method of claim 3, wherein said estimating step comprises the steps of determining whether the corresponding subband signal is predominately speech or noise, and updating the estimated noise level when the subband signal is determined to be predominantly noise.

5. An apparatus for providing a noise component within a processed telecommunication signal, such that the noise component of the processed telecommunication signal is spectrally matched with a noise component of a corresponding unprocessed telecommunication signal, comprising an analysis filter for dividing the unprocessed telecommunication signal into a plurality of subband input signals;

noise determining means for determining a noise level within each of the subband input signals;

a signal processor including means for independently variably attenuating each of the subband input signals, thereby to provide processed subband signals;

noise injection means for generating a plurality of subband noise signals such that each subband noise signal is modulated in proportion with the determined noise level and the variable attenuation of each of the subband input signals, and for combining each of the subband noise signals with the respective processed subband signals; and combining means for combining the processed subband signals to provide the processed telecommunication signal.

6. A spectral noise compensation method for a telecommunication signal processor configured to apply a variable attenuation to each of a plurality of subbands of a telecommunication signal, the method comprising:

generating a noise signal having subband noise components, including the step of independently controlling levels of each noise component in proportion the variable attenuation applied to a corresponding subband portion of the telecommunication signal;

injecting the noise signal into the telecommunication signal to provide a noise injected signal; and transmitting said noise injected signal toward a destination.

7. The method of claim 6, wherein said telecommunication signal has an original noise content having an original noise spectrum, and including the steps of:

determining subband noise levels of the original noise content; and further controlling the level of each noise component in proportion to the respective determined subband noise levels, whereby the spectrum of the noise signal is matched to the original noise spectrum.

* * * * *